Sept. 3, 1963
H. STEINMANN ETAL 3,102,776
APPARATUS AND PROCESS FOR CONTINUOUS
PRODUCTION OF SHAPED PLASTIC WEBS
Filed Dec. 14, 1960 2 Sheets-Sheet 1
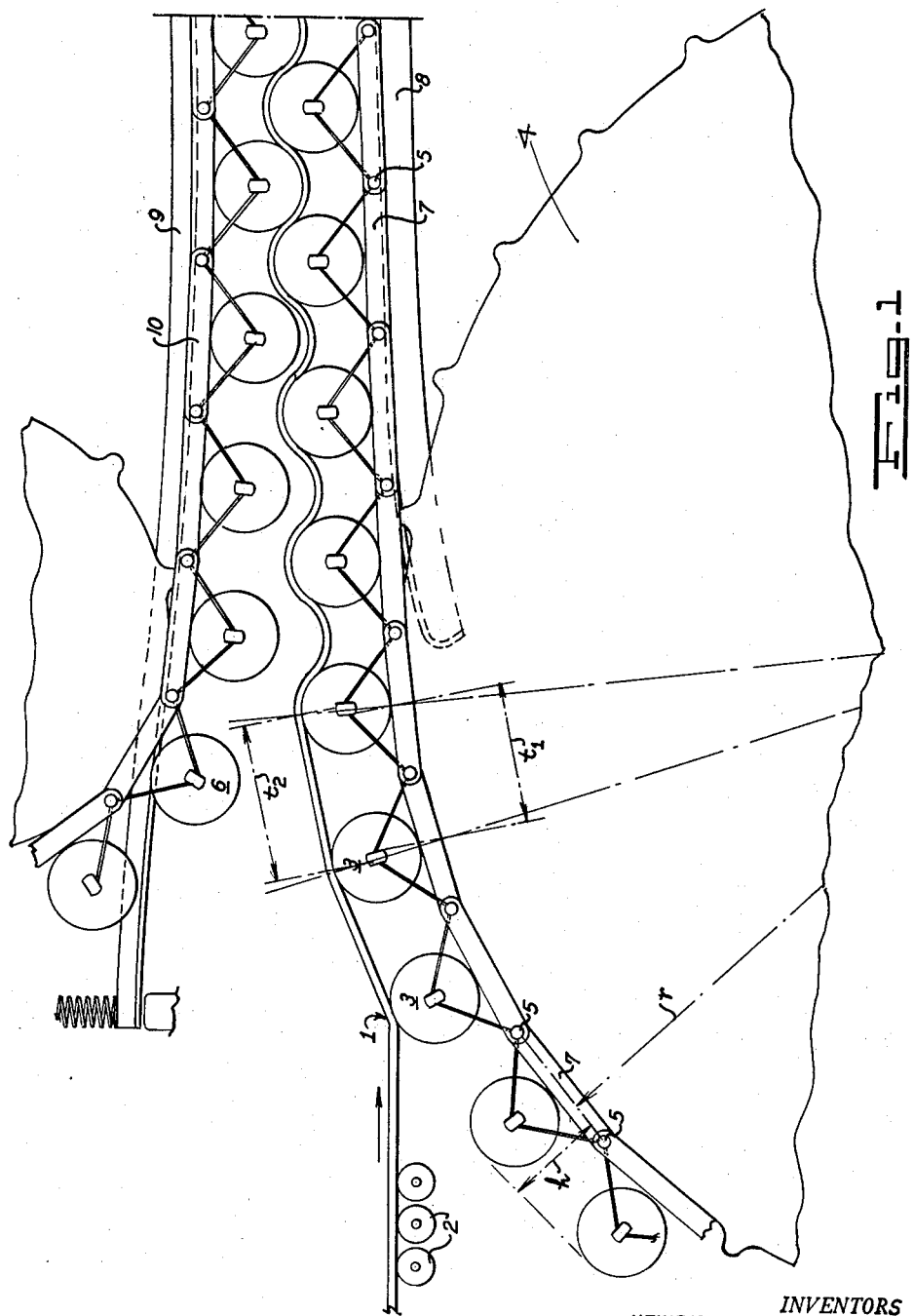
INVENTORS
HEINRICH STEINMANN
MICHAEL WIENAND
PETER RHEINFELD
BY
*Burgess Dinklage & Sprung*
ATTORNEYS

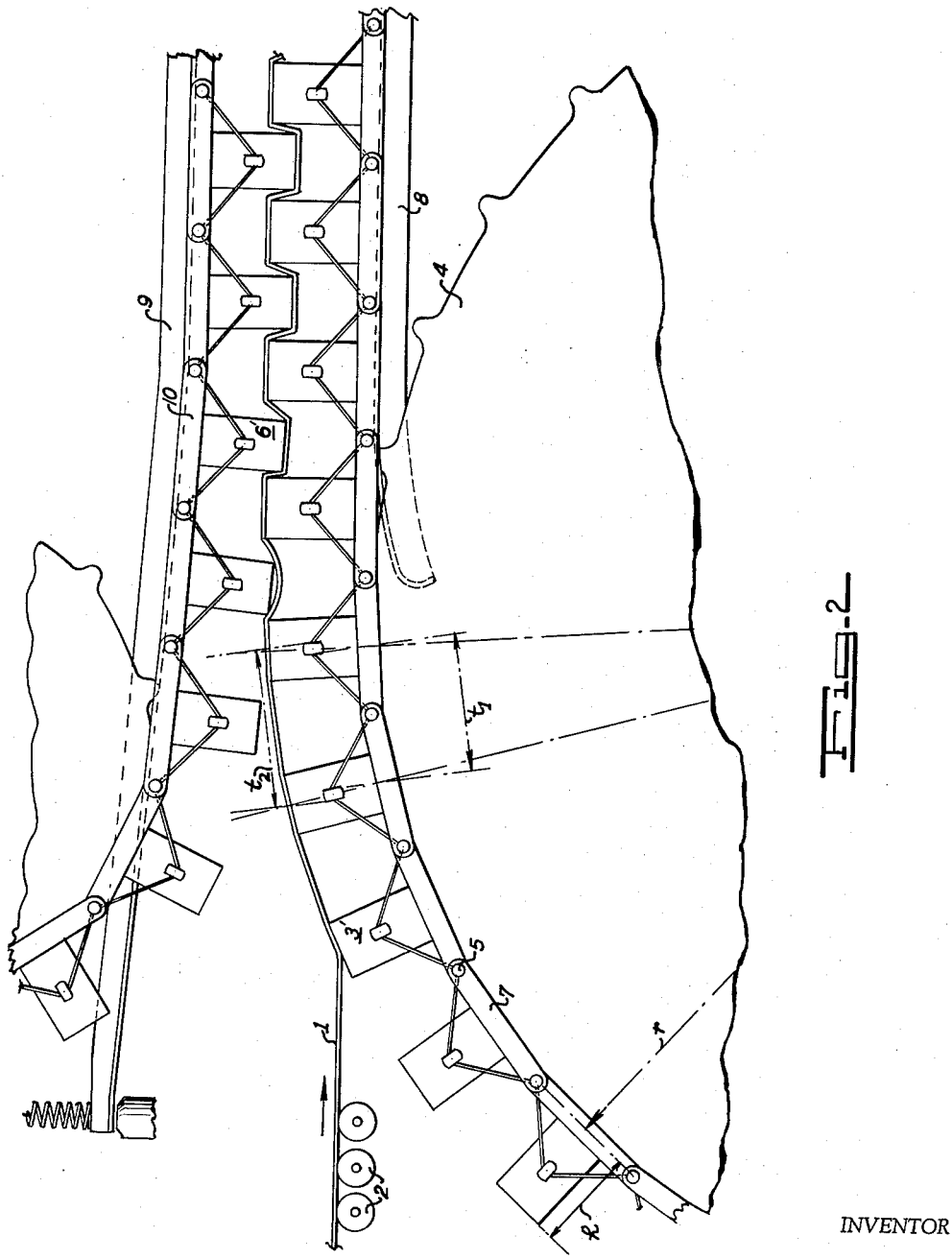

United States Patent Office 3,102,776
Patented Sept. 3, 1963

3,102,776
APPARATUS AND PROCESS FOR CONTINUOUS PRODUCTION OF SHAPED PLASTIC WEBS
Heinrich Steinmann, Troisdorf, Michael Wienand, Siegburg, and Peter Rheinfeld, Troisdorf, Germany, assignors to Dynamit Nobel, A.G., Patentabteilung, Troisdorf, Bezirk Cologne, Germany, a corporation of Germany
Filed Dec. 14, 1960, Ser. No. 75,796
Claims priority, application Germany Dec. 30, 1959
2 Claims. (Cl. 18—56)

The present invention relates to the continuous production of shaped plastic webs and more particularly to the production of corrugated webs molded between a pair of coacting endless chain means.

It is known to produce shaped plastic webs, sheets, foils, and the like, such as for example corrugated webs, by employing hot presses to impart the desired shaping of the web. Where it is sought to produce shaped plastic webs of extended lengths, however, the use of hot presses becomes impractical since the pressing apparatus would have to conform to the linear dimensions of the web to be shaped. The prohibitive costs involved in such an attempt discourage the production of shaped plastic webs of extended dimensions. Nevertheless, it has also been proposed to conduct plastic webs continuously through a hot press apparatus whereby the desired shaping of the webs or foils is carried out using pressing forms and/or pressing rollers capable of imparting the desired molded or shaped qualities.

A particular device has been used heretofore in which the forming or molding press consists of two endless bands positioned for rotational movement whereby the web may be passed therebetween during travel of the endless bands along the coacting portion therebetween. In this connection, the bands move along a straight path and are provided along the coacting surfaces thereof with shaped elements arranged one adjacent the next. Consequently along passage of the web through the straight-path between the coacting endless bands, a continuous wave-surface is imparted to the web by means of the shaped elements. Thus, the pressed portion of one element is engagingly disposed between the correspondingly adjacent pressed portions of elements carried by the other endless band. For this purpose, the elements of one band are staggered with respect to the elements of the other band and a slight interval is provided between the elements of both bands to accommodate the web material therebetween. Upon suitable heating and subsequent cooling, the shaped or corrugated web may be continuously produced during rotation of the cooperating endless bands.

In particular, with respect to the production of corrugated sheets, or foils of plastic materials, devices have been proposed which are provided with axially grooved cylinders or rollers between which the web material is passed so that the desired shaping may be effected. Shaping devices, consisting of a pair of endless driven chain bands are also known wherein the web to be shaped is conducted between the cooperating bands in the well known manner. In this instance, the individual shape-imparting members are staggered with respect to one another so as to afford proper engagement therebetween such that the crest of one member in one band engages the valley defined between adjacent members of the other band.

All of the aforementioned devices and procedures for imparting desired shapes and corrugations to webs of plastic materials suffer from the important disadvantage that very pronounced elongations and stretching are produced as well as injurious strains and stresses on the web material, particularly if the profile-shape of the continuous web is angular in configuration.

It is an object of the present invention to overcome the foregoing drawbacks and to provide an apparatus and process for the continuous production of shaped plastic webs molded between a pair of coacting endless chain means wherein each chain means has shape-imparting means disposing therealong in staggered relation with respect to one another.

It is another object of the present invention to provide for the continuous production of such webs while avoiding elongation, stretching, injurious strains and stresses, and the like.

Other and further objects of the invention will become apparent from the study of the within specification and accompanying drawings in which:

FIG. 1 is a schematic side view of the leading portion of an apparatus in accordance with the invention with certain parts shown in section, and FIG. 2 is a similar view to that of FIG. 1 illustrating an alternate embodiment in accordance with the invention.

In accordance with the present invention, it has been found that an apparatus for the continuous production of shaped plastic webs molded between a pair of coacting endless chain means may be provided which comprises a first and a second endless chain means having a plurality of coacting shape-imparting means disposed thereon, each of said chain means being mounted for movement on a pair of spaced apart wheels with a corresponding intermediate longitudinal portion of each chain means engaging the other chain means by means of said shape-imparting means to achieve the shaping of the web disposed therebetween. One of the wheels is provided as a feeding wheel having its corresponding chain means disposed thereon so as to receive the incoming web thereat, the shape-imparting means being positioned on the curved portion of the chain means on said wheel in radially outwardly spaced relation thereto. In this manner, upon passage of the chain means from the wheel to the intermediate longitudinal portion, the shape-imparting means become displaced toward one another so that the distance apart of the corresponding radially outermost points of adjacent shape-imparting means is correspondingly diminished.

Thus, in the molding treatment of plastic webs to form continuous corrugated webs, the web is conducted between a pair of endless coacting chain means each mounted for movement on a pair of spaced apart sprocket wheels and each having a plurality of shape-imparting means disposed therealong for resiliently urgingly engaging corresponding shape-imparting means disposed along the other chain means in staggered relation thereto, and the desired corrugated shape is conveniently achieved. In accordance with the invention the web is fed to the peripheral portion of one of the chain means mounted on the leading sprocket wheel therefor at a rate which maintains the length of the web between adjacent shape-imparting means substantially equal to the peripheral length of the chain means corresponding thereto without pronounced slack. Thereafter the web is conducted on the chain means along at intermediate longitudinal path in resilient urging engagement between the corresponding shape-imparting means of the two chain means in staggered relation to one another while at the same time maintaining the length of the web between the adjacent shape imparting means of the chain means in pronounced slack condition so that the web length along the straight longitudinal path is equal to the original peripheral length of the chain means corresponding thereto at said sprocket wheel portion during the feeding of the web. In this manner, by changing from a curved to a straight path of travel, the web has sufficient length to cause a slackening or depression in the space between adjacent shape-imparting means of the chain means. Accordingly, when the second chain means is placed in urging engagement with the first chain means, during passage of the web through the intermediate longitudinal portion, no undue stretching or deformation will occur and the web will be free from injurious strains and stresses heretofore encountered in prior operations. In the well-known manner, the plastic web is suitably cooled such as by blowing air thereagainst from above and from below to remove the heat supplied to the web in the intermediate longitudinal portion of the endless chain means. Consequently, while the web is heated to conveniently achieve the shaping of the same between the shape-imparting means, the same is thereafter suitably fixed by cooling. At the same time, the surface of the web may be smoothed in accordance with conventional techniques and any after-treatments may be employed as desired.

Referring to the drawing, in FIG. 1, the plastic web or foil 1 passes over the feeder rollers 2 in the direction of the arrow and is received along the peripheral portion of the chain by shaping rods 3, which are fixedly mounted between chain links 7. Chain links 7 are pivotally interconnected by pivot connectors 5. At the feed position of the plastic web or foil, the shaping rods 3 are disposed along a curved path in consequence of the mounting of the endless chain means made up of links 7 on the sprocket wheel 4. The distance between a point in a link 7 and a corresponding point in the next adjacent link 7, or the distance between pivot connectors 5, is defined by $t_1$. The distance $t_2$ is the length between the radially outermost point of one shaping rod 3 and that of the next adjacent shaping rod 3. The distance $t_2$ is therefore measured at a greater radial distance from the center of the sprocket-wheel 4 than is the distance $t_1$. Accordingly the distance $t_1$ may be considered the distance between respective chain links 7 while the distance $t_2$ may be considered the distance between corresponding shaping rods 3 at their outermost periphery.

The radial distance from the center of sprocket-wheel 4 to the links 7 of the chain means is defined by $r$ while the distance of the outermost peripheral point of the shaping rods 3 thereabove is defined by $h$. Thus, the peripheral point of contact between the web 1 and the shaping rods 3 is a radial distance from the center of sprocket wheel 4 equal to the sum of $r$ and $h$.

The height $h$ is determined as the product of the radius $r$ of sprocket wheel 4 and the ratio of $t_3:t_1$ wherein $t_3$ is the difference in length between $t_2$ and $t_1$. Consequently, the distance between corresponding outermost peripheral points of adjacent shaping rods 3 is reduced in the transition of the chain means from sprocket wheel 4 to the straight-line path in the intermediate longitudinal portion of the endless chain means between the two sprocket wheels. In this connection, the other end of the chain made up of links 7 is mounted on a second sprocket wheel (not shown) so that the chain will rotate in clock-wise direction so as to receive web or foil 1 and conduct the same through the shaping operation and out the opposite end.

It will be seen from FIG. 1 by closing up the distance between adjacent shaping rods 3 due to the transition from a curved path to a straight path, the plastic web forms a depression or slack beween successive rods 3. In this manner a preliminary shaping is achieved without stress and strain on the web 1. During the further course of the web along the longitudinal path corresponding shaping rods 6 disposed on the cooperating chain means made up of links 10 engage the depressions of web 1 between adjacent rods 3. Links 10 in the same manner form an endless chain mounted on two corresponding spaced apart sprocket wheels one of which is partially shown and the other of which is correspondingly positioned adjacent the other sprocket wheel of the first-mentioned endless chain.

The web 1 passes through the intermediate longitudinal portion of the coating endless chains between the spaced apart sprocket wheels such that the rods 3 and 6 are maintained in staggered relationship with respect to one another to impart the desired corrugated shape to the web. By means of guide elements 8 and 9 respectively, the two cooperating endless chain means are urged resiliently toward one another so as to abuttingly engage the web 1 therebetween for effecting the desired shaping operation. Guide elements 8 and 9 are desirably spring mounted in a manner that the same are urged toward one another under an adjustable pressure. Advantageously, guide elements 8 and 9 outwardly diverge so as to effect a gradual increase at the feeding end and decrease at the outlet end of the pressure engagement between the respective endless chains.

With respect to FIGURE 2 a similar embodiment is shown, the difference being that in this figure, the shaping rods 3' and 6' are rectangular in cross section rather than circular in cross section in the manner of rods 3 and 6 of FIG. 1. Consequently, the web 1 is shaped in an angular manner rather than in a continuous waving configuration as shown in FIG. 1. The operation and elements in this figure correspond to those of FIG. 1.

The web during the shape-imparting operation in the intermediate longitudinal portion may be suitably heated in the well-known manner to aid in the fixing of the shape desired and thereafter the web may be air cooled and after-treated as desired.

It will be appreciated that the chain links 7 are maintained a distance from the center of the sprocket wheel 4 equal to the radius $r$ while the radially outermost point of the shaping rod 3 or 3' (and accordingly rods 6 and 6') is maintained at a height $h$ above links 7 and at a radial distance $h+r$ from the center of wheel 4. Thus, the distance $t_2$ between a radially outermost point of a rod and that of the next adjacent rod disposed on the wheel 4 is greater than the corresponding distance $t_1$ of that portion of the chain link 7 defined by a chord to the arc described at the distance $r$ between the radii passing from the center of the wheel 4 to the outermost points of the adjacent rods.

What is claimed is:

1. In the process for the molding treatment of plastic webs to form continuous corrugated webs, in which the web is conducted between a pair of endless coacting chain means each mounted for movement on a pair of spaced apart sprocket wheels and each having a plurality of shape-imparting means disposed therealong for resiliently urgingly engaging corresponding shape-imparting means disposed along the other chain means in staggered relation thereto to achieve the corrugated shape, the improvement which comprises feeding said web to the peripheral portion of one of said chain means mounted on the leading sprocket wheel therefor, without engagement with the other chain means, at a rate which maintains the length of said web between adjacent shape-imparting means substantially equal to the peripheral length of the chain means corresponding thereto without pronounced slack, and thereafter conducting the web on said chain means along a longitudinal path in resilient urging engagement between the corresponding shape-imparting means of the two chain means in staggered relation to one another while maintaining the length of said web between the adjacent shape-imparting means of said one chain means in pronounced slack condition, said last-mentioned length being substantially equal to the original peripheral length of the chain means corresponding thereto on said sprocket wheel during the feeding.

2. Improvement according to claim 1 wherein the web is fed to a chain means disposed along a curved path having a radius $r$ at a peripheral distance $h$ thereabove such that the web is disposed along a corresponding curved path having a radius $h+r$, whereby upon subsequently conducting said chain means along a longitudinal path, the web will sag between corresponding shape-imparting means disposed along said chain means.

References Cited in the file of this patent

UNITED STATES PATENTS

| | | |
|---|---|---|
| 1,293,295 | Amidon | Feb. 4, 1919 |
| 1,297,304 | Ford | Mar. 11, 1919 |
| 2,200,262 | Daley et al. | May 14, 1940 |
| 2,281,860 | Renault | May 5, 1942 |
| 2,350,996 | Atkinson et al. | June 13, 1944 |
| 2,649,888 | Foy | Aug. 23, 1953 |
| 2,695,652 | Segil | Nov. 30, 1954 |
| 2,764,193 | Knowles | Sept. 25, 1956 |

FOREIGN PATENTS

| | | |
|---|---|---|
| 1,043,627 | Germany | Nov. 13, 1958 |
| 204,767 | Australia | Aug. 10, 1959 |